United States Patent Office 3,064,989
Patented Nov. 20, 1962

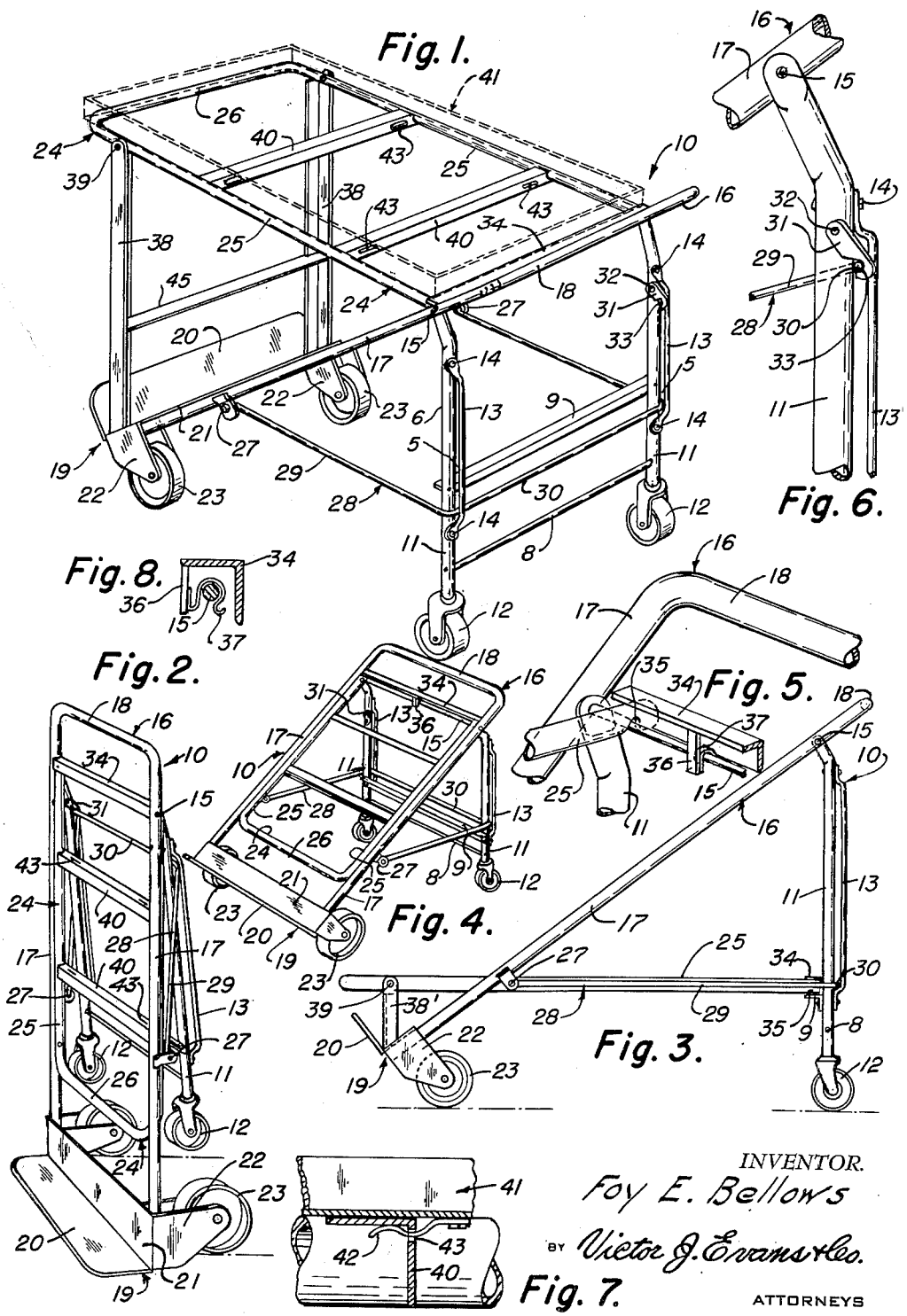

3,064,989
CONVERTIBLE DOLLY-TYPE VEHICLE
Foy E. Bellows, Dallas, Tex., assignor to Atlantis Electronics Corporation, Garland, Tex., a corporation of Texas
Filed Aug. 31, 1960, Ser. No. 53,102
5 Claims. (Cl. 280—41)

This invention relates to a wheeled dolly.

The object of the invention is to provide a wheeled dolly which is provided with a convertible frame so that the dolly can be readily and conveniently used for different purposes desired.

Another object of the invention is to provide a dolly which can be readily adjusted to different positions as desired and wherein when the dolly is not being used it can be readily folded to occupy a minimum amount of space for storage or shipment.

A still further object of the present invention is to provide a dolly which is easy to erect and fold, and which will occupy a minimum amount of space in storage and which is easy to operate, and wherein the dolly can be used in various types of localities and in industry, stores, homes, hotels, hospitals and the like and can be placed in a truck, automobile or the like when desired or required.

A further object of the invention is to provide a dolly which is extremely simple and inexpensive to manufacture.

Other objects and advantages will be apparent in the course of the following description.

In the accompanying drawings, forming a part of this application, and in which like numerals are used to designate like parts throughout the same:

FIGURE 1 is a side perspective view of the dolly showing the parts in extended position.

FIGURE 2 is a side perspective view of the dolly showing the parts in collapsed position.

FIGURE 3 is a side elevational view showing the parts in a different position.

FIGURE 4 is a front perspective view showing the parts in a position making it possible to lift objects from the floor and convey them from place to place wherein the said device can also be used as a step ladder in this position.

FIGURE 5 is a fragmentary perspective view with parts broken away and in section showing locking mechanisms.

FIGURE 6 is a fragmentary perspective view showing certain constructional details of the present invention.

FIGURE 7 is a fragmentary sectional view illustrating one of the spring members for fastening a tray to the device.

FIGURE 8 is a sectional view illustrating certain constructional details of the present invention.

Referring in detail to the drawings, the numeral 10 indicates the dolly of the present invention which is shown to comprise a foldable supporting frame 6 having spaced parallel legs 11 which have casters or wheels 12 connected thereto. Brackets 13 are connected to the legs 11 in any suitable manner, as for example by means of securing elements 14 to form slots 5.

There is further provided a rod 15, and the numeral 16 indicates a U-shaped main frame which includes spaced parallel bars 17 that are connected to the rod 15, and the frame 16 further includes an end piece 18.

There is further provided a support member which is indicated generally by the numeral 19, and the support member 19 includes right angularly arranged plate portions 20 and 21. Ears 22 depend from the portion 21 and are secured thereto or formed integral therewith, and wheels 23 are connected to the ears 22, FIGURE 2.

The numeral 24 indicates a U-shaped auxiliary frame which includes a pair of spaced parallel arms 25 and a cross piece 26.

Lugs 27 depend from the bars 17 and are secured thereto, and the numeral 28 indicates a U-shaped holding member which includes spaced parallel side pieces 29 that are connected to the lugs 27, and the holding member 28 further including a web portion 30 which extends through the slots 5 formed by brackets 13, FIGURE 1.

The numeral 31 indicates a latch which is pivotally connected to one of the legs 11 by means of a pivot pin 32, and the latch 31 is provided with a slot 33 for at times receiving the web portion 30 of the holding member 28, for example when the parts are in the collapsed position in FIGURE 2.

There is further provided an L-shaped beam 34 which may be secured as by welding to the arm 25, and the arms 25 are provided with notches 35 for selectively receiving or engaging the rod 15, FIGURE 5. The numeral 36 indicates a brace that carries a locking spring 37 which is adapted to engage the rod 15.

The numeral 38 designates each of a pair of posts which have their upper ends pivotally connected to the arms 25 as at 39, and the lower ends of the posts 38 are adapted to rest upon the support member 19. Instead of using the elongated post 38 shown in FIGURE 1, a shorter post 38′ may be used when the parts are in the position in FIGURE 3. The posts 38 fold up and lie parallel to the arms 25 allowing the posts 38′ to support the front end of the auxiliary frame 24 as shown in FIGURE 3 when arranged for use as a platform dolly. Both pairs of posts 38 and 38′ are fastened with the same bolts 39 to the auxiliary frame 24.

Extending between the pair of members 5 and secured thereto in any suitable manner, as for example by welding, is a plurality of spaced parallel braces 40 which are adapted to selectively support a tray such as the tray 41. The braces 40 are provided with slots 43, whereby spring member 42 on the bottom of the tray 41 can extend through the slots 43 as shown in FIGURE 7 so as to maintain the tray 41 immobile on the dolly.

From the foregoing, it is apparent that there has been provided a four wheel dolly, and wherein the dolly has a convertible frame for adapting the dolly to different uses.

According to the present invention there has been provided a dolly which consists of a normally inclined main frame and an adjustable auxiliary frame, and the main frame is supported by means of front wheels on its forward or lower end and by a foldable wheel supported rear frame, the auxiliary frame being pivoted to the main frame for movement between a position parallel with the main frame and a position in a horizontal plane and in which latter position the auxiliary frame serves as a work table or as a means of transporting material from a level plane. Furthermore, the auxiliary frame can be arranged in a low position so as to become a platform dolly.

Furthermore, according to the present invention there has been provided a convertible dolly which has many diversified uses due to its unusual design so that it can be used to lift objects from the floor and convey them from place to place and by a simple manipulation of the auxiliary frame, the device can be used to support and convey objects on angle positions. Furthermore, because of the novel design and construction of the dolly including the main frame and the auxiliary frame and the foldable parts, the device can be readily collapsed so as to occupy a minimum amount of space for storage or shipment, as for example as shown in FIGURE 2.

The holding member 28 is made in a U-shape, with each end bent outward and extending through holes in the brace or lugs 27; and the lugs 27 are attached to each side of the main frame 16, the lugs 27 acting as part of a hinge when positioning the dolly. Each end of the U-shaped folding member 28 acts as a support for the auxiliary frame when in collapsed position parallel with the main frame 16 as shown in FIGURE 4.

The parts can be made of any suitable material and in different shapes and sizes.

The device can be used in regular hand trucks and it is extremely flexible and can be adapted to practically any special demand. The dolly will facilitate various jobs such as moving, lifting, storing, or else the device can be used as a work table, or as a display stand and wherein the device will eliminate stooping, and is easy and handy to use.

When the dolly is set up for use, the main frame 16 may extend up at an angle. Furthermore, with the parts arranged as shown in FIGURE 4, the dolly makes an ideal step ladder or can be used for lifting objects off the floor, and the tube casters give added protection from tilting.

The device can be used with a shelf which can be readily removed and the auxiliary frame holds the shelf in place. The auxiliary frame can be readily and easily manipulated. The two front legs 38 can be used or else the shorter legs 38' can be used and the long legs can be folded under and parallel with the top frame, and the long legs index the short legs and continue indexed when collapsed.

Another important feature is the removability of the top frame with the brace 36 and lock 37 to hold the parts securely in position and wherein the lock 37 can easily be released for lowering the frame 24 to the platform dolly position. The locking lever 31 can be easily locked when lifting the holding member 28 up to locking position. Furthermore, the holding member 28 is attached to each back leg 11 by slots 5 so as to facilitate manipulation of the supporting frame 6 and provide the safety feature when the dolly is under a heavy load.

It is to be noted that the unit is always supported with four wheels when in use in any position and the foldup is for storage only.

It is to be noted that when the parts are in the position of FIGURE 3, the member 34 is supported on or rests on a crosspiece 9, and the crosspiece 9 may consist of an angle iron, bar or the like. The numeral 8 indicates a horizontally disposed brace which is arranged below the crosspiece 9.

Minor changes in shape, size and rearrangement of details coming within the field of invention claimed may be resorted to in actual practice, if desired.

I claim:

1. A dolly comprising a U-shaped main frame including spaced parallel bars, a rod extending between said bars, first and second spaced parallel legs pivotally connected to said main frame by said rod, casters connected to said legs, brackets connected to each of said legs to define a pair of slots, a support member secured to said bars, said support member including right angularly arranged plate portions, spaced parallel ears depending from said support member, wheels connected to said ears to support the front of said main frame, a U-shaped holding member including spaced parallel side pieces and a web portion, said web portion extending through said slots, means pivotally connecting said side pieces to said bars, a latch pivotally connected to one of said legs for selectively engaging said web portion, a U-shaped auxiliary frame including a pair of spaced parallel arms and a cross piece, notches formed in the rear portion of said arms for selectively engaging said rod, and posts having their upper ends pivotally connected to the front portions of said arms and their lower ends engaging said support members.

2. The structure as defined in claim 1 further including a plurality of L-shaped braces connected to said arms, said braces having slots formed therein for receiving spring members on a tray.

3. A dolly comprising a normally inclined main frame, wheels supporting said main frame as its lower end, a pair of legs pivotally connected to said main frame for supporting said main frame at its upper end, casters connected to said legs, holding means for selectively maintaining said legs in one of a position substantially parallel to said main frame and a position substantially vertical to said main frame, an auxiliary frame, and means for selectively supporting said auxiliary frame in one of an upper horizontal position and a lower horizontal position, said auxiliary frame being pivotally connected to the main frame adjacent the upper end of said main frame for foldability into parallelism with said main frame when supported in the upper horizontal position.

4. A dolly as defined in claim 3 further including an L-shaped support member attached to the lower portion of said main frame, said means for selectively supporting said auxiliary frame including a first pair of posts and a second pair of posts each having their upper ends pivotally connected to the forward portion of said auxiliary frame, said first pair of posts being longer than the second pair of posts, the lower ends of said first pair of posts engaging said L-shaped support member when said auxiliary frame is supported in said upper horizontal position and the lower ends of said second pair of posts engaging said support member when said auxiliary frame is supported in said lower horizontal position.

5. A dolly as defined in claim 4 wherein said holding means comprises a U-shaped member including spaced parallel side pieces and a web portion, means pivotally connecting said side pieces to said main frame, bracket means attached to at least one of said legs to define a slot, said web portion extending through said slot and latch means pivotally connected to one of said legs for selectively engaging said web portion when said legs are maintained in position substantially parallel to said main frame.

References Cited in the file of this patent

UNITED STATES PATENTS

| 1,203,194 | Haege | Oct. 31, 1916 |
| 1,965,944 | Lea | July 10, 1934 |
| 2,054,967 | Dahl | Sept. 22, 1936 |
| 2,377,815 | Sides et al. | June 5, 1945 |
| 2,606,770 | Reichert | Aug. 12, 1952 |
| 2,726,875 | Murcott | Dec. 13, 1955 |

FOREIGN PATENTS

| 392,864 | France | Oct. 9, 1908 |